United States Patent [19]

Migda

[11] Patent Number: 4,990,840
[45] Date of Patent: Feb. 5, 1991

[54] METHOD AND SYSTEM FOR CONTROLLING A MACHINE TOOL SUCH AS A TURNING MACHINE

[75] Inventor: Kenneth F. Migda, Sterling Heights, Mich.

[73] Assignee: The Cross Company, Fraser, Mich.

[21] Appl. No.: 517,396

[22] Filed: Apr. 30, 1990

Related U.S. Application Data

[63] Continuation of Ser. No. 363,447, Jun. 6, 1989, abandoned, which is a continuation of Ser. No. 157,877, Feb. 19, 1988, abandoned.

[51] Int. Cl.$^5$ ............................................. G05B 19/25
[52] U.S. Cl. .................................. 318/571; 318/610; 318/617; 364/165; 364/474.3
[58] Field of Search ..................... 318/561, 567–572, 318/600–611, 615–618, 724; 364/161–166, 474.01–474.03, 474.28–474.3, 447.35

[56] References Cited

U.S. PATENT DOCUMENTS

| | | | |
|---|---|---|---|
| 4,200,925 | 4/1980 | Cushman | 364/107 |
| 4,250,544 | 2/1981 | Alley | 364/110 |
| 4,458,321 | 7/1984 | Whitney et al. | 364/513 |
| 4,486,693 | 12/1984 | Hamati et al. | 318/561 |
| 4,578,747 | 3/1986 | Hideg et al. | 364/151 |
| 4,612,489 | 9/1986 | Gunda | 318/590 |
| 4,623,827 | 11/1986 | Ito | 318/618 |
| 4,626,758 | 12/1986 | Takeuchi et al. | 318/603 |
| 4,638,230 | 1/1987 | Lee | 318/603 |
| 4,639,884 | 1/1987 | Sagues | 318/603 |
| 4,641,070 | 2/1987 | Pfizenmaier et al. | 318/603 |
| 4,653,360 | 3/1987 | Compton | 82/18 |
| 4,672,550 | 6/1987 | Winterbottom et al. | 364/474 |
| 4,694,390 | 9/1987 | Lee | 364/165 |
| 4,697,125 | 9/1987 | Goff et al. | 318/615 |
| 4,705,996 | 11/1987 | Harshberger, Jr. et al. | 318/160 |
| 4,792,737 | 12/1987 | Goff | 318/254 |

FOREIGN PATENT DOCUMENTS

2184381 6/1984 United Kingdom .

OTHER PUBLICATIONS

Ben H. Carlisle, "Programmable Filters Stabilize Digital Motor Control", 903 Machine Design, 57 (1985) Mar., No. 6, Cleveland, Ohio, USA.
K. Hiroi and Y. Terauchi, "Two Degrees of Freedom Algorithm", 8131 Advances in Instrumentation 41 (1986) Part 2, Research Triangle Park, NC, USA.

Primary Examiner—William M. Shoop, Jr.
Assistant Examiner—David Martin
Attorney, Agent, or Firm—David R. Syrowik; Raymond J. Eifler

[57] ABSTRACT

A method and system (10) for controlling radial movement of a machine tool, such as a turning machine, relative to a workpiece (11), is characterized by a digital filter (70, 72, 74) which produces a filtered final control signal which is a function of both radial position and velocity of a cutting tool (24) of the turning machine. The method and system (10) utilizes a tool position feedback signal which is compared with an initial control signal to produce a signal which is then digitally filtered to, in turn, provide the resulting final control signal. The surface geometry of the workpiece (11), such as a piston, is determined by a data matrix of angular, axial and radial position coordinates of the tool. An angular position signal representative of the angular position of the workpiece (11) and an axial position signal representative of the axial position of the cutting tool (24) relative to the workpiece (11) are both generated. The angular and axial position signals are correlated with the data matrix to generate the initial control signal. The control loop of the system (10) is closed within the software portion of the system (10) for increased reliability. Also, there is no need for velocity loop feedback with a velocity transducer. Feed forward compensation is performed in the software portion of the system (10). The digital filter (70, 72 74) is preferably implemented with a digital algorithm on a digital signal processing microprocessor of an axis control board (38).

10 Claims, 3 Drawing Sheets

METHOD AND SYSTEM FOR CONTROLLING A MACHINE TOOL SUCH AS A TURNING MACHINE

This is a continuation of co-pending application Ser. No. 363,447 filed on June 6, 1989 which is a continuation of U.S. Ser. No. 157,877 filed on Feb. 19, 1988, now abandoned.

BACKGROUND ART

This invention relates to method and system for controlling a machine tool, such as a turning machine.

The control of machine tools, such as turning machines, has evolved greatly over the past decade or so. However, one constant has remained, that is, the requirement for correlating the cutting tool's radial position with the rotation of the part to produce a desired shape. This correlation was provided in some early turning machines by a mechanical cam and follower system. However, this required the actual turning of a template workpiece. This prevented the simplified adaptability of such a machine tool when different shaped workpieces, such as pistons, were to be turned.

The general idea of applying a CNC system to a cutting tool subsequently evolved. In such a system, a computer and a numerical control with a feedback loop compared a position signal representing the present position of the tool to a program position signal to produce an error signal which controlled energization of a linear motor driving the tool.

The use of a CNC system allows parts, such as pistons, having an elliptical cross-sectional shape to be turned at greater than 1,200 rpm. In such a system the cutting tool must make tool reciprocations radially of the part for each complete revolution of the part. In the case of a piston rotating at 2,000 rpm this requires that the cutting tool execute precisely controlled oscillations at a frequency of 80 hz. In the case of a piston rotating at 3,600 rpm, the cutting tool must oscillate at a frequency of 120 hz. At 2,400 rpm, if a 0.015 inch radial displacement is required, the corresponding acceleration amounts to 315 feet/second$^2$.

The control of the oscillating cutting tool is complicated by the load imposed by the interaction of the cutting tool with the rotating part. Consequently, the cutting tool must be constructed and supported to react to the loads, such as inertia, friction and transient cutting forces, without undesired side effects, such as tool chatter and/or deflection, so that the desired contour of the part can be achieved.

The control system of such a turning machine preferably should have: a steady state accuracy of 20 micro inches or better; an overshoot to a step command of less than 5%; a stiffness of no less than 300,000 lbs. per inch; and an update rate of once for every degree of workpiece rotation at 1,800 rpm (i.e. every 92 micro seconds).

The prior art includes a CNC turning machine, including a CNC system wherein closed loop control of the turning operation is performed on a part such as an elliptical piston. The relative axial position of the part to the cutting tool and the rotary position of the part about the axis of rotation are precisely controlled and known at all times. The CNC acts upon a part program in conjunction with the closed loop control to issue correlated commands for use in controlling a voice coil motor and, hence, the radial oscillations of a cutting tool coupled thereto. Commands are transmitted via a highspeed data link to a position profile computer which translates the commands into an appropriate form causing the voice coil motor to produce a double oscillation of the cutting tool for each revolution of the part. The position profile computer is dedicated to the radial position of the cutting tool and forms a portion of the closed loop control of the cutting tool position. Various sensors, including a velocity transducer, provide feedback signals to the closed loop control wherein the loop is closed in hardware. U.S. Pat. No. 4,653,360 entitled "CNC Turning Machine" and issued Mar. 31, 1987 is an example of such prior art.

The speed of digital signal processing microprocessors such as the Texas Instrument TMS 320 family of microprocessors and systems utilizing the LM628 chip from National Semiconductor of Santa Clara, Calif. have allowed the use of complex algorithms on microprocessor-based control systems. The feasibility of any such control system is a function of the number of mathematical operations involved in the control program difference equation(s), and especially the number of multiplications.

A digital filter is a circuit or computer program that may be both linear and time-invariant and operates on discrete time signals. Digital filters can be built with conventional digital hardware or can also be implemented as digital programs on suitable general purpose or special purpose computers or microcomputers.

There are two basic types of digital filters, recursive or infinite-impulse-response filters and non-recursive or finite-impulse-response filters. Causal varieties of these filters can be developed from continuous time functions in many well-known fashions.

SUMMARY OF THE INVENTION

The method of the present invention is characterized by the step of digitally filtering at least one of a number of discrete time signals, such as a tool position feedback signal, and a final control signal, wherein the resulting final control signal controls the radial position of the tool as a function of tool position and velocity.

The system of the present invention is characterized by digital filter means for performing the above-noted method step.

An advantage of the present invention is to provide a method and system for controlling a machine tool, such as a turning machine, by utilizing a digital filter to eliminate the need for a velocity transducer.

Another advantage of the present invention is to provide a method and system for controlling a machine tool, such as a turning machine, wherein a control loop of the system is closed within a software portion of the system for increased reliability and simplicity.

Yet still another advantage of the present invention is to provide a method and system for controlling a machine tool, such as a turning machine, wherein feed forward compensation is performed by a software portion of the system to eliminate unnecessary hardware.

Other advantages accruing to the use of the method and system as described above are numerous. For example, the system and method are capable of automatically machining workpieces, such as pistons, which have an elliptical cross-section with extremely high tolerances in a reliable and cost-efficient fashion. Such method and system are particularly useful in the mass production of such pistons for automobile engines.

The above advantages and other advantages and features of the present invention are readily apparent from the following detailed description of the invention when taken in connection with the accompanying drawings.

DETAILED DESCRIPTION OF THE INVENTION

Figure 1:
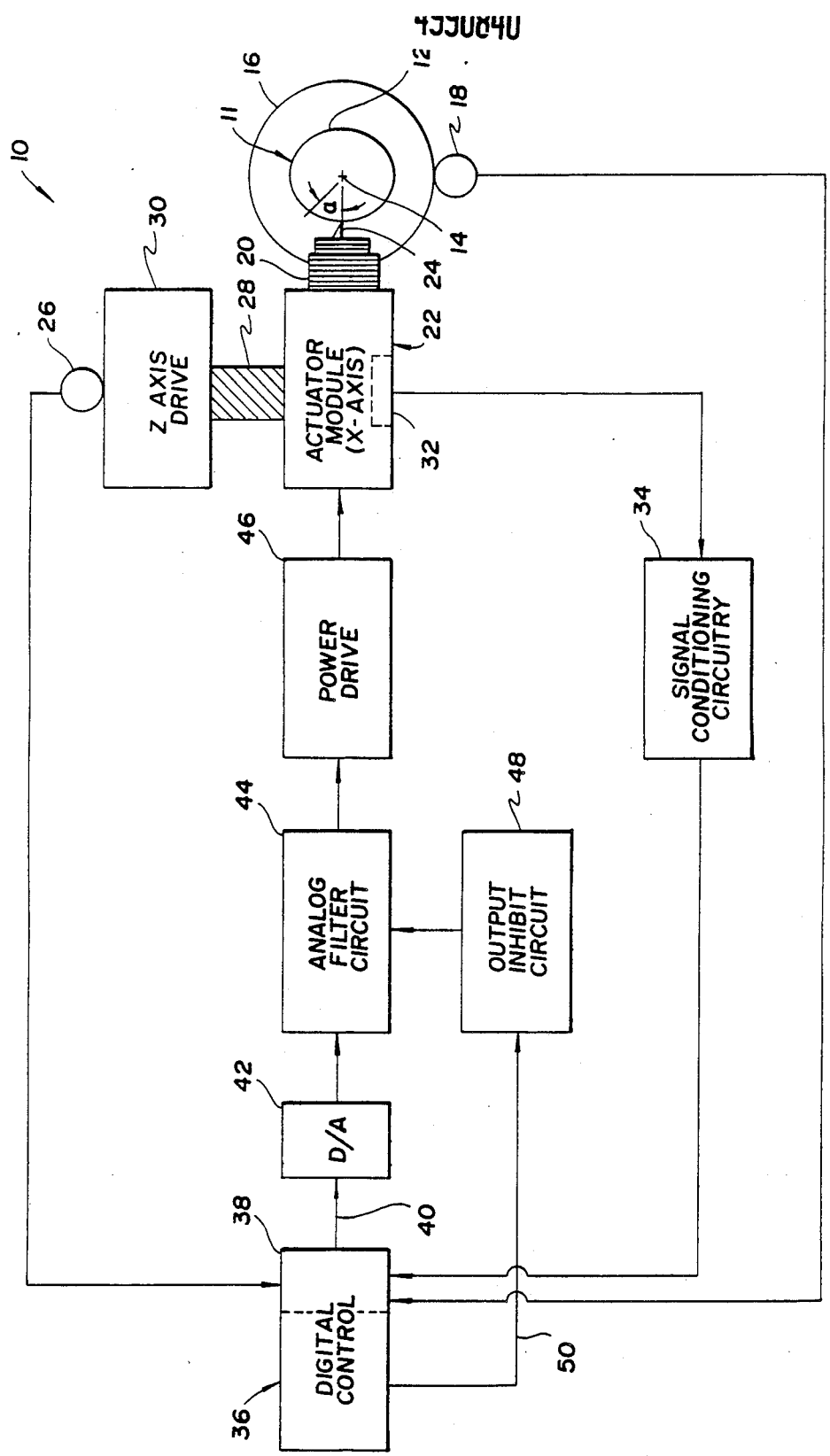
FIG. 1 is a generalized block diagram of a control system of the present invention.

Referring now to FIG. 1, there is illustrated a workpiece to be machined by a machine tool under control of a control method and system, generally indicated at 10, of the present invention. In particular, FIG. 1 illustrates a piston, generally indicated at 11 of an automotive vehicle being turned by a cutting tool 20 of a turning machine as described in U.S. Pat. No. 4,653,360 (having the same assignee as the present application and which is hereby expressly incorporated by reference). A complex (i.e. elliptical) surface 12 of the piston 11 is illustrated diagrammatically and is exaggerated in proportion to what would typically be the proportion in an actual piston. The actual difference between major and minor axes of the piston 11 is approximately 0.015 inches.

As in U.S. Pat. No. 4,653,360, the surface 12 may be considered as having a generally frustoconically tapered shape wherein the actual cross section of the surface is elliptical. This can be seen from FIG. 1 which is representative of both an end view and a cross section of the piston 11.

The surface 12 is preferably defined as a set of discrete points in space and are most conveniently identified in terms of a three-dimensional coordinant system or matrix where one coordinant represents the angular location about a longitudinal axis 14 of the piston 11. Another coordinant represents longitudinal (i.e. axial) locations along the length of the axis 14. The third coordinant represents the length of a radial from the surface 12 to the axis 22. In this way the surface geometry of the piston 11 is represented by a data matrix of angular, axial and radial position coordinants of the tool. It is to be understood, however, that in some cases, such as when the radial position coordinant does not change along the axial length of the piston 11, there may not be a need for axial position coordinants in the data matrix.

The degree of precision in the discrete point definition of the surface geometry of the piston 11 is a function of the number of points used. In other words, the finer the point resolution, the more precise the surface definition.

The piston 11 is suitably coaxially chucked and rotated about the axis 14 by means of a conventional drive and live center spindle 16. Preferably, the angular velocity of the spindle 16 is relatively constant and rotates the piston at 1,200 or greater rpm.

As the piston 11 turns about the axis 14, its angular position about the axis 14 is continuously monitored by a spindle encoder 18. The angular position of a cutting tool 24 mounted within its tool holder 20 on an acutator module, generally indicated at 22, relative to the axis 14 is known and is essentially constant as the cutting tool tip oscillates substantially coincidentally with a radial to the axis 14. Consequently, the monitored angular position can be used to determine the angular coordinant of the piston 11 as the piston 11 is being presented to the cutting tool tip at any given instant in time as the piston 11 rotates.

The actuator module 22 includes a slide and a supported electric linear motor, such as a voice coil motor. The module 22 is mounted for Z-axis movement on a ball servo and nut assembly 28, as described in detail in the above-noted patent. The ball servo and nut assembly 28 is coupled to a Z-axis drive 30, including a servo motor, for translating the actuator module 22 along the Z-axis. Preferably, the steady state error along the Z-axis is less than 0.001 inches and the overshoot is less than 10%.

At any given instant in time, the angular position of the piston 11 and the longitudinal position of the piston 11 define the point of the piston 11 which is being presented to the cutting tool tip.

The longitudinal position of the piston 11 relative to the cutting tool 24 is continuously monitored by a Z-axis encoder 26. Preferably, the Z-axis encoder 26 provides approximately 512 lines or greater pulses per revolution of the ball screw 28 and has quadrature outputs. Also, preferably, the spindle encoder 18 provides approximately 900 pulses per revolution of the spindle 16 and has quadrature outputs.

The actuator module 22 further includes a linear position transducer or encoder 32 mounted thereon. Preferably, the encoder 32 is a glass scale reference system which utilizes non-contact, electro-optical reader heads for determining the exact position of the slide relative to the base of the actuator module 22. A steel scale reference, alternatively, may be used.

Preferably, the encoder 32 provides approximately 1,270 lines or pulses/inch of travel. This number is multiplied by a factor of 10 to 12,700 pulses per linear inch of travel by signal conditioning circuitry 34.

A digital control, generally indicated at 36, receives the pulses from the Z-axis encoder 36, the signal conditioning circuitry 34 and the spindle encoder 18. The digital control preferably comprises an industrial version of the IBM PC-XT having an axis control board 38 inserted therein. The control board 38 is a version of a commercially available board from Motion Research Inc. of Plymouth, Minn. and has a model number PC303, Part No. B00-T303-01.

The control board 38 outputs a digital final control signal on line 40 which serves as the input to a digital-to-analog converter circuit 42 which may be incorporated on the control board 38. The output from the digital-to-analog converter circuit 42, in turn, is provided as an input to an analog filter circuit 44. The analog filter circuit 44 preferably includes conventional band-reject or notch filters.

The output from the analog filter circuit 44 is provided as the input to a linear power amplifier or power drive 46 which supplies power to the electric linear motor of the actuator module 22.

The digital control 36 also controls an output inhibit circuit 48 along line 50 which, in turn, inhibits the output if a malfunction occurs.

Figure 2:
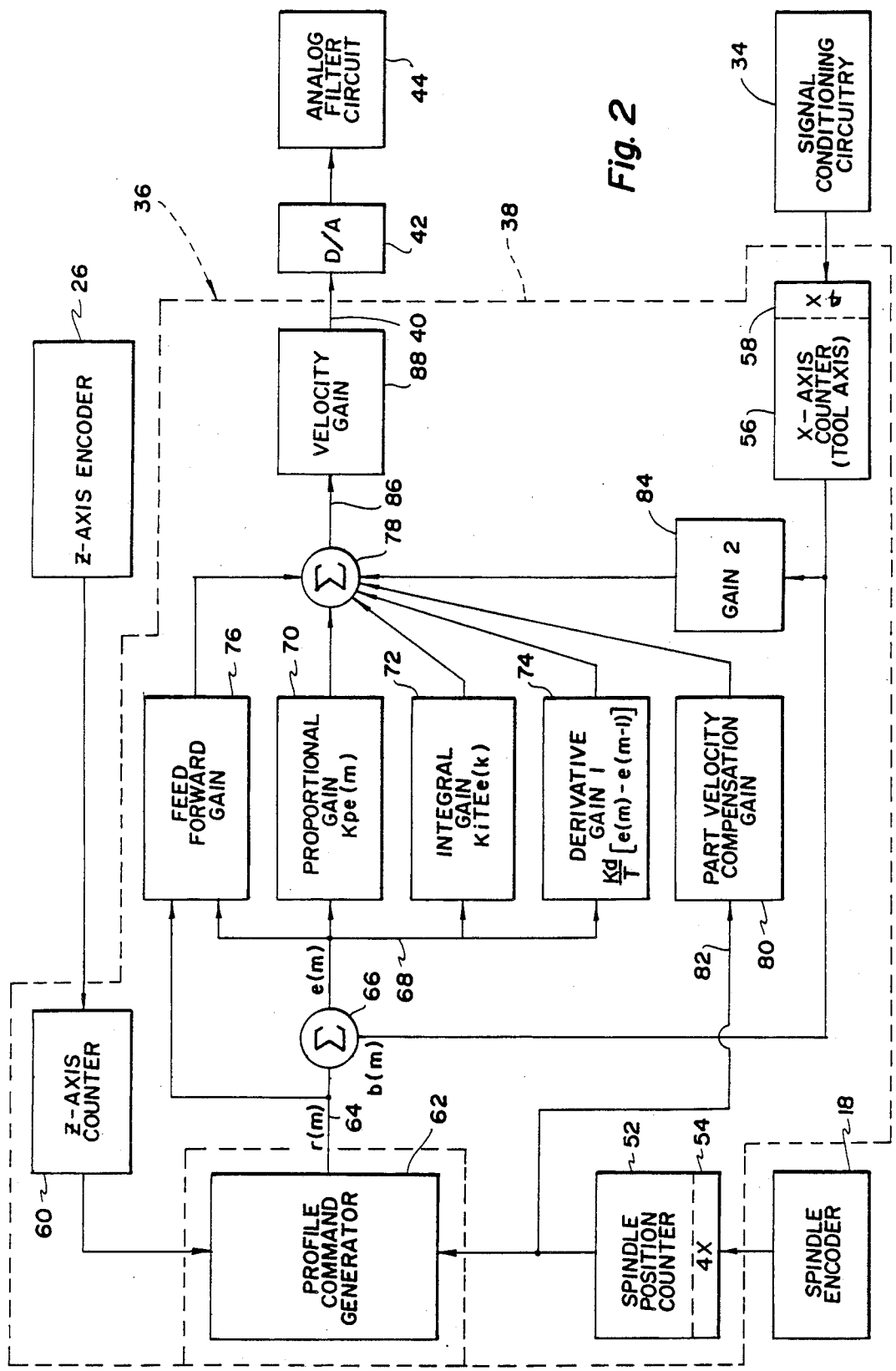
FIG. 2 is a more detailed block diagram of a part of the system including the digital control block of FIG. 1.

Referring now to FIG. 2, there is illustrated in block diagram form the various hardware and transfer functions performed within the digital control 36. In particular, the control board 38 within the digital control 36 in effect includes a spindle position counter 52 immediately preceded by a pulse multiplier circuit 54 which, preferably, multiplies the number of pulses received from the spindle encoder 18 by a factor of four.

The control board 38 in effect includes an X or tool axis counter 56 which is immediately preceded by a multiplier circuit 58 which multiplies the number of pulses received from the signal conditioning circuitry 34 also by a factor of four.

In like fashion, the control board 38 further includes a Z-axis counter 60 which counts the number of pulses received from the Z-axis encoder 26.

The IBM PC-XT has contained within its memory the data matrix which provides the part surface definition. The programmed PC is responsive to the counts contained within the spindle position counter 52 and the Z-axis counter 60 to perform the function of a profile command generator 62. The PC correlates the axial and angular position signals received from the Z-axis and the spindle axis counters 60 and 52, respectively with the data matrix to generate an initial control signal on line 64.

The initial control signal is compared with the count contained within the X-axis counter 56 at a comparing means or summing junction 66 to produce an error or final control signal appearing on line 68. The final control signal on line 68 is fed into blocks 70, 72 and 74 which define a digital filter and, in particular, the gains of a PID loop. However, it is to be understood that the digital filter may be other infinite or finite impulse-response type digital filters. The gains provided by the blocks 70, 72 and 74 are performed on the control board 38 under control of a digital signal processing microprocessor contained thereon.

The initial control signal on line 64 is preferably provided as an input to a feed forward gain block 76, the output of which is provided to a second summing junction 78. The output of block 76 modifies the resulting final control signal collectively provided by the blocks 70, 72 and 74 at the summing junction 78.

Preferably, another type of feed forward signal is provided to the summing junction 78 to further modify the resulting final control signal from a part velocity compensation gain block 80. The count from the spindle position counter 52 along line 82 is input to the block 80 and the output thereof is fed to the junction 78.

Also, preferably, a second digital filter in the form of a pseudo derivative feedback (i.e. PDF) block 84 receives the count from the X-axis counter 56 and further provides modification of the resulting final control signal at the summing junction 78. The signal from the block 84 provides clamping or stability gain.

The resulting final control signal appears on line 86 which is input into a velocity gain block 88 for amplification. The resulting amplified signal appears on line 40 for input into the digital-to-analog converter 42, as previously mentioned.

Figure 3:
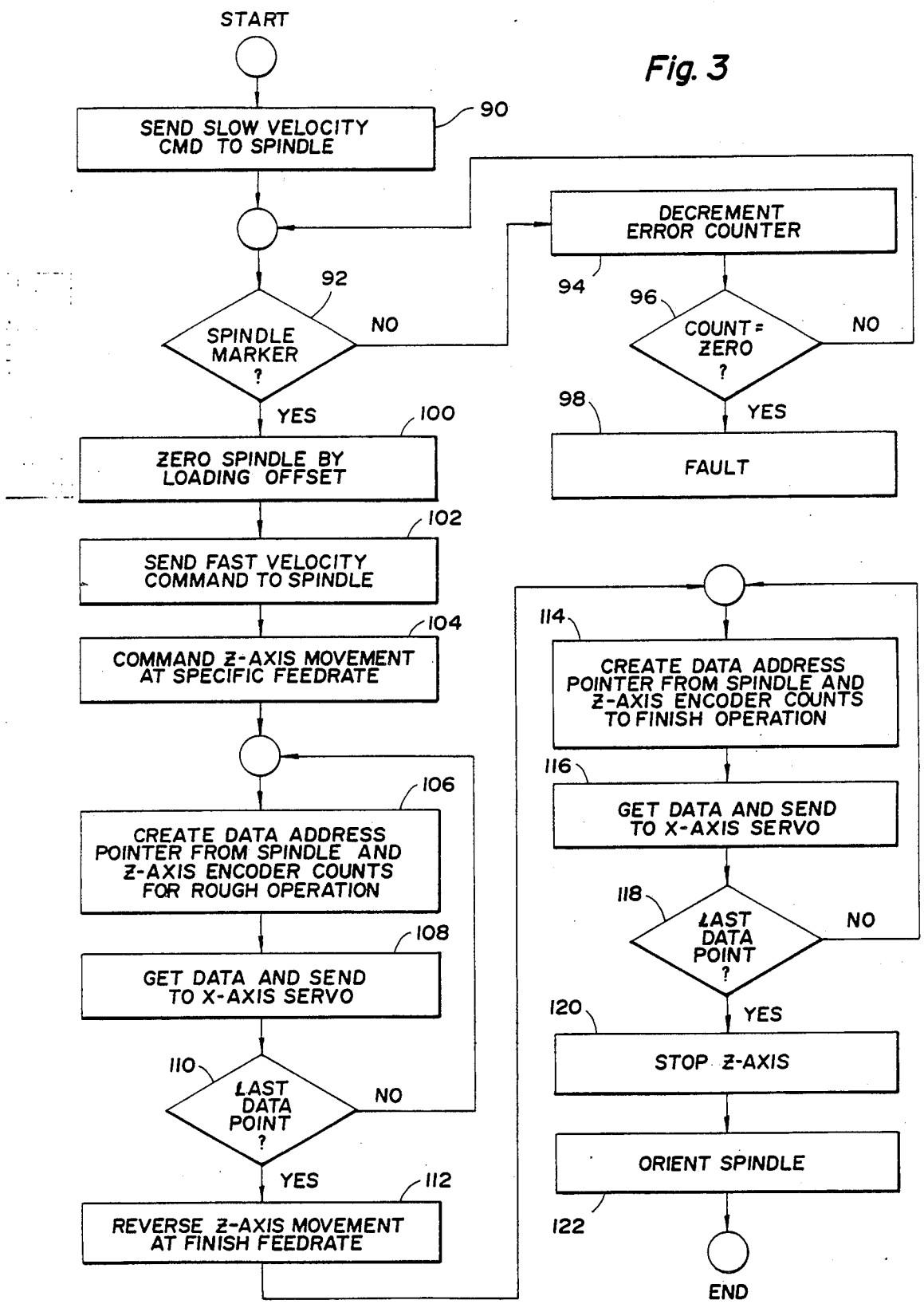
FIG. 3 is a block diagram in flowchart form illustrating the operation and synchronization of the X-axis of a turning machine controlled by the method and system of the present invention.

Referring now to FIG. 3, there is illustrated a basic flow diagram of the control software for the system 10 of the present invention. To allow for mechanical alignment of the piston 11 with the electronic position of the piston 11 via the spindle encoder 18, the spindle position has a programmable offset indicated by angle "a" in FIG. 1 which represents the angular displacement between mechanical zero and the marker position of the encoder 18.

In block 90, initially a slow velocity command is issued to the spindle actuator to rotate the spindle 16.

In block 90, the digital control 36 checks to see if the spindle marker has been reached. If it has not, an error counter within the digital control 36 is decremented at block 94. The count within the error counter is tested at block 96 and, if zero, a fault signal is generated as indicated by block 98.

If the count within the error counter is not zero, the spindle marker is again checked at block 92 and, if it is still not found, then the error counter is again decremented until either the fault condition is indicated or the spindle marker is finally reached.

When the spindle marker is finally reached at block 100, the spindle counter is zeroed by loading an offset into the spindle counter.

At block 102, a fast velocity command is sent to the spindle 16.

At block 104, the Z-axis is commanded to move at a specific feed rate.

At block 106, a data address coordinate is created from the spindle and Z-axis encoder counts within the counters 52 and 60, respectively, for rough turning the piston 11.

At block 108, the stored matrix data is obtained from the previously generated address pointer and is sent by the digital control 36 to the X-axis servo of the actuator module 32.

At block 110, a test is performed to see whether the last data point has been sent to the X-axis servo. If not, the blocks 106 and 108 are repeated. If the last piece of data has been sent to the X-axis servo, Z-axis movement is reversed at a finish feed rate as indicated by block 112.

At block 114, a data address pointer is created from the spindle and Z-axis encoder counts within the counters 52 and 60, respectively, for the finish turning operation.

At block 116, the data from the address pointer is retrieved and sent to the X-axis servo.

At block 118, a decision is made to determine whether the last data point has been read. If not, blocks 114 and 116 are repeated. If the last data point has been read, the Z-axis servo is stopped at block 120.

At block 122, the spindle is then oriented prior to removal of the piston 11 from the spindle 16.

The above-described method and system of the present invention provides numerous advantages over the prior art. For example, the digital control 36 accepts a single feedback signal representative of tool radial position and by digital filtering produces a command or final control signal which is a function of both tool position and velocity. This allows the elimination of a velocity feedback loop with its associated velocity transducer. This is desirable since such a velocity transducer introduces resonances into the system. Also, because the control loop of the present method and system is closed in software, it is more reliable and less complex than if the control loop was closed in hardware. Also, additional control hardware can be reduced, such as control hardware utilized for feed forward compensation.

While the digital filter can either be implemented in hardware or software, it is preferably implemented in software. The digital filter can be either an infinite-impulse-response type or finite-impulse-response type from which a control, such as PID control, can be derived.

The invention has been described in an illustrative manner, and, it is to be understood that, the terminology which has been used is intended to be in the nature of words of description rather than of limitation. Many modifications and variations of the present invention are possible in light of the above teachings. It is, therefore, to be understood that, within the scope of the appended claims, the invention may be practiced otherwise than as specifically described.

I claim:

1. A method for controlling the position of a tool (24) movable relative to a surface of a workpiece (11) rotatable about a rotational axis (14) in a machining operation, said method comprising the steps of: generating an angular position signal representative of the angular position of the workpiece; generating an initial control signal as a function of the angular position signal; generating a tool position feedback signal representative of the position of the tool; generating a final control signal as a function of the initial control signal and the tool feedback signal to control the position of the tool as a function of tool position wherein the improvement comprises:
the tool position feedback signal is a function of a series of discrete signals representative of a position of the tool and wherein the method further comprises the step of digitally filtering the tool position feedback signal;
generating a velocity compensation signal derived from the current angular position of the workpiece; and
modifying the final control signal so that the final control signal is a function of the velocity compensation signal and the filtered tool position feedback signal.

2. The method of claim 1 wherein the surface geometry of the workpiece is determined by a data matrix of angular, radial and axial position coordinants of the tool to determine the surface geometry of the workpiece and wherein the method further comprises the step of generating an axial position signal representative of the axial position of the tool relative to the workpiece, and wherein the step of generating the initial control signal includes the step of correlating the axial position signal and the angular position signal with the data matrix to generate the initial control signal as a function of both the angular and axial position signals.

3. The method of claim 1 further comprising the steps of generating a feed forward as a function of the initial control signal and modifying the final control signal so that the final control signal is a function of the feed forward signal.

4. A system (10) for controlling the position of a tool (24) movable relative to a surface of a workpiece (11) rotatable about a rotational axis (14), the system (10) including: angular position sensor means (18) for producing an angular position signal representative of the angular position of the workpiece (11); means (62) for generating an initial control signal as a function of the angular position signal; an electric motor (22) coupled to the tool (24) for movement of the tool (24) as a function of a final control signal; tool position feedback means (32,34) for producing a tool position feedback signal representative of the position of the tool; means (66) for generating the final control signal as a function of the tool position feedback signal and the initial control signal to control the position of the tool (24) as a function of tool position, wherein the improvement comprises:
the tool position feedback signal is a function of a series of discrete signals representative of a position of the tool and wherein the system further includes digital filter means (84) for digitally filtering the tool position signal;
means (80) for generating a velocity compensation signal derived from the current angular position of the workpiece; and
means (78) for modifying the final control signal so that the final control signal is a function of the velocity compensation signal and the processed tool position feedback signal.

5. The system of claim 4 wherein the surface geometry of the workpiece is determined by a data matrix of angular, radial and axial position coordinants of the tool to determine the surface geometry of the workpiece (11) and wherein the system further comprises axial position sensor means (26) for producing an axial position signal representative of the axial position of the tool (24) relative to the workpiece (11) wherein said means (62) for generating the initial control signal correlates the angular and axial position signals with the data matrix to generate the initial control signal as a function of both the angular and axial position signals.

6. The system of claim 5 wherein said angular position sensor means (18) includes first encoder means (18) for producing a first series of pulses representative of the angular position of the workpiece and wherein the system further comprises first counter means (52) for producing a first counter signal as a function of the first series of pulses, said means (62) for correlating utilizing the first counter signal to produce the initial control signal and said means (80) for generating utilizing the first counter signal to produce the velocity compensation signal.

7. The system of claim 6 wherein said feedback means (32,34) includes second encoder means (32) for producing a second series of pulses comprising the series of discrete signals and representative of the position of the tool (24) and wherein the system further comprises second counter means (56) for producing a second counter signal comprising the tool position feedback signal as a function of the second series of pulses, said means (66) for generating the final control signal utilizing the second counter signal to produce the final control signal.

8. The system of claim 4 further comprising means (76) for generating a feed forward signal derived from the initial control signal, said means for modifying the final control signal as a function of the feed forward signal.

9. The system of claim 7 further comprising third encoder means (26) for producing a third series of pulses representative of an axial position of the tool (24) relative to the workpiece (11) and third counter means (60) for producing a third counter signal as a function of the third series of pulses, said means (62) for generating the initial control signal utilizing the third counter signal to produce the initial counter signal.

10. The system of claim 7 wherein said second encoder means (32) is a glass scale reference system.

* * * * *